Aug. 16, 1955   J. F. McKINNEY, JR., ET AL   2,715,566
ROTATABLE GAS CONTACTING APPARATUS
Filed Nov. 20, 1953   3 Sheets-Sheet 1

INVENTORS.
JOHN F. McKINNEY, JR.
MAURICE L. WEBSTER, JR.
BY
Robert O. Spindle
ATTORNEY

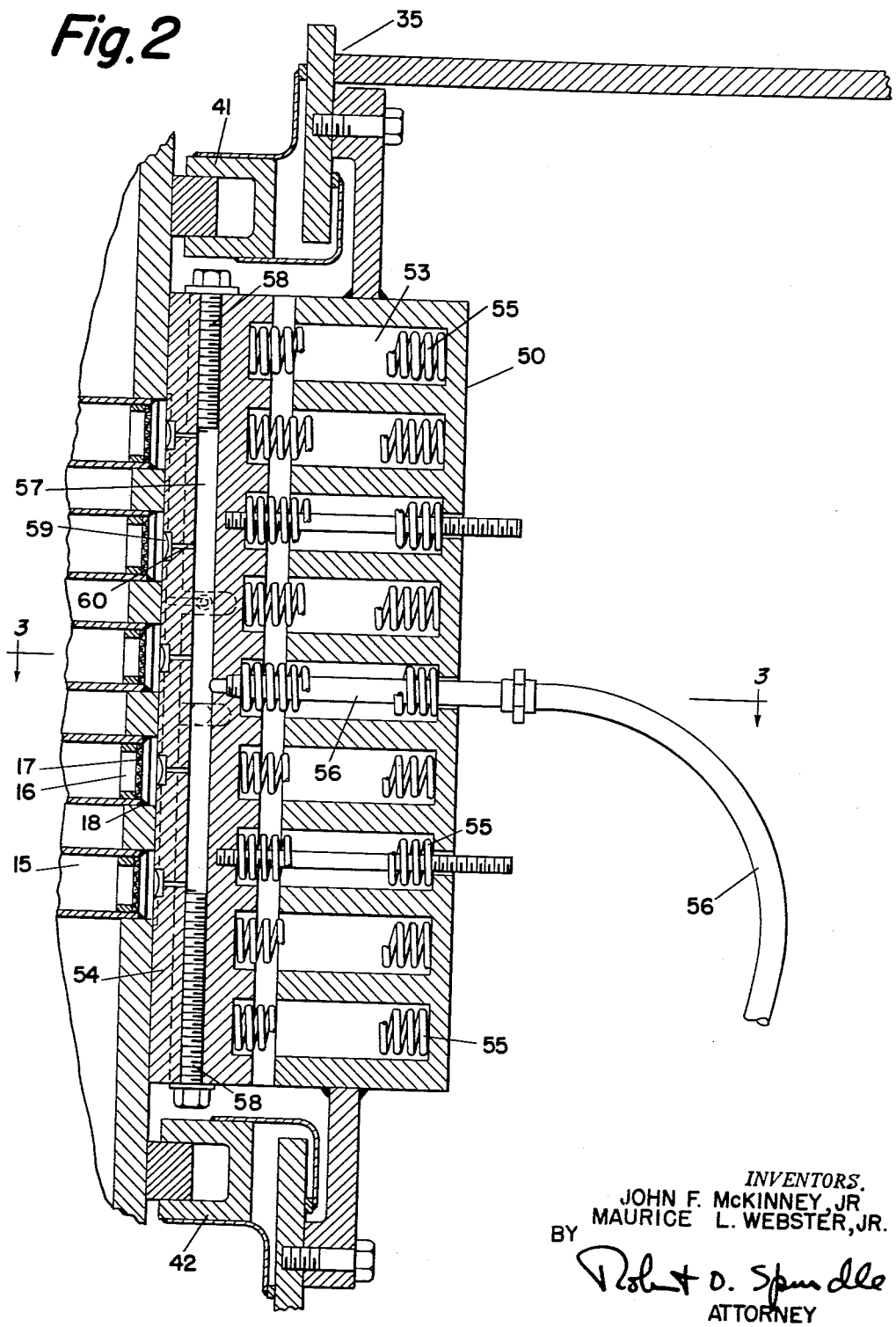

Aug. 16, 1955     J. F. McKINNEY, JR., ET AL     2,715,566
ROTATABLE GAS CONTACTING APPARATUS
Filed Nov. 20, 1953     3 Sheets-Sheet 3
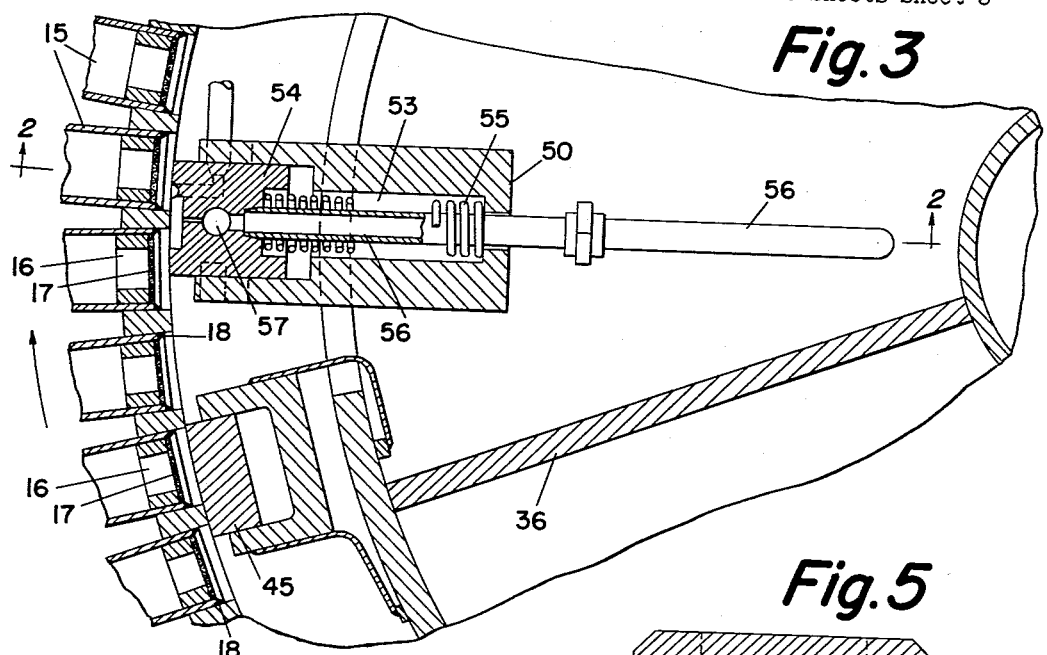
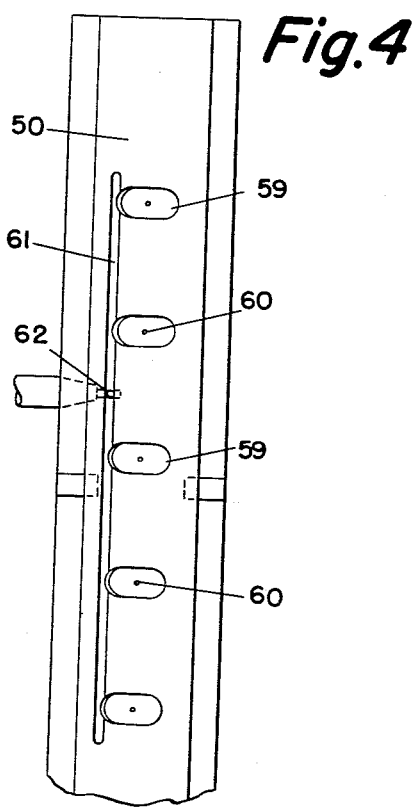
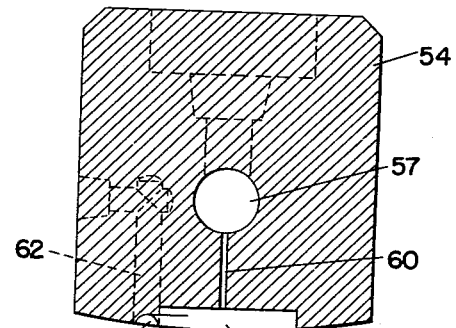
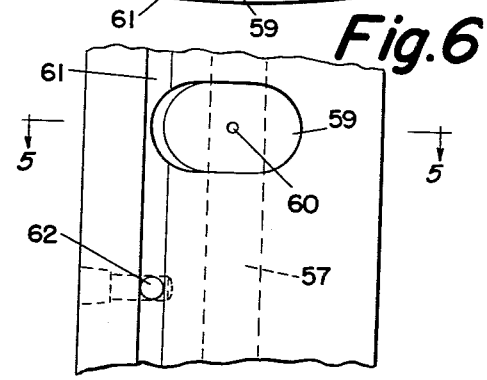
INVENTORS.
JOHN F. McKINNEY, JR.
MAURICE L. WEBSTER, JR.
BY
ATTORNEY

United States Patent Office 2,715,566
Patented Aug. 16, 1955

2,715,566

ROTATABLE GAS CONTACTING APPARATUS

John F. McKinney, Jr., and Maurice L. Webster, Jr., Swarthmore, Pa., assignors to Sun Oil Company, Philadelphia, Pa., a corporation of New Jersey Application November 20, 1953, Serial No. 393,446

7 Claims. (Cl. 23—288)

In an application filed by Clarence H. Thayer, Serial No. 380,027, filed September 14, 1953 (later allowed, and issued March 22, 1955, as Patent No. 2,704,741), as a continuation of earlier filed applications, there is illustrated and described a novel type of converter in which fluid organic reactants are converted to other organic products by contact with a catalyst and alternately with which the catalyst by contact with other fluids is regenerated for contact with later supplies of fluid organic reactants. The invention of said application is especially applicable, although not limited, to conversion by catalysis of higher boiling hydrocarbons to mainly lower boiling hydrocarbons, as in the well known petroleum oil cracking plants. In this illustrative process, after such catalytic conversion, the catalyst is purged by a suitable fluid, then regenerated by a suitable reactant, and again purged by a suitable fluid, thus completing the cycle and reconditioning the catalyst for conversion of higher boiling hydrocarbons to mainly lower boiling hydrocarbons.

This process has been widely used commercially for many years, it being practiced in what are known as the fixed bed process, the moving bed process and the fluid catalyst process.

The converter disclosed in said application is of a type entirely different from those in commercial use and different also from other proposed converters in that it embodies certain features of novelty and importance that adapt it to successul commercial use.

The subject-matter of this application is an improvement on the type of converter disclosed in said application Serial No. 380,027. Such converter comprises a fixed outer cylindrical casing, a fixed inner cylindrical casing, an annular rotatable reaction vessel between the two casings and spaced from both to form inner and outer circumferential spaces, partitions in the inner casing dividing its interior into sections, vertically and circumferentially extending inner and outer seals between the rotatable reaction vessel and the inner and outer casing, the inner seals dividing the inner circumferential space into independent arcuate spaces communicating with the respective sections, the outer seals dividing the outer circumferential space into independent arcuate spaces paired with the inner independent arcuate spaces, and a multitude of catalyst-containing compartments, preferably but not necessarily in the form of tubes, extending radially or transversely through the reaction vessel and having inner inlets and outer outlets which, in the rotation of the reaction vessel, afford communication between successive pairs of inner and outer arcuate spaces.

In said application, when, for example, the converter is utilized in the cracking operation above referred to, the main hydrocarbon reactant that is supplied to one of the sections of the inner casing and the arcuate space communicating therewith and thence to the group of catalyst-containing tubes that at any given time is receiving such reactant, is in gas phase. It is desirable, however, to also introduce, into the catalytic tubes that are receiving such gaseous reactant, a regulable proportion of a liquid hydrocarbon reactant. This is accomplished in said application by means of a feed pipe which conveys such hydrocarbon liquid into the same arcuate space that is receiving hydrocarbon reactant from the inner casing. This simple means of supplying the hydrocarbon in liquid phase to the reaction vessel is operative and to a degree practical, but it is not entirely satisfactory. Such part of the liquid that enters the gas-filled arcuate space and is not directly discharged into catalyst tubes flows down the wall of the reaction vessel. This results in different catalyst tubes at different levels receiving varying percentages of hydrocarbon liquid relative to hydrocarbon gas. Moreover, such of the liquid that fails to be injected into the catalyst adheres to the wall of the reaction vessel and forms thereon a carbonaceous deposit.

It is the object of this invention to provide, in an apparatus of the hereinbefore described construction, an improved means for injecting the liquid hydrocarbon reactant into the catalyst tubes so directly as to insure that its admixture with the gaseous hydrocarbon reactant occurs mainly or wholly within the catalyst chambers; for insuring a uniform supply of the liquid hydrocarbon to all of the catalyst tubes; for insuring against liquid, directed toward catalyst tubes at an upper level, flowing downward and thence flowing into catalyst tubes at a lower level; and finally for insuring that substantially all the liquid hydrocarbon fed to the reactor will be injected into the catalyst tubes with avoidance of formation of deposits on the wall of the reaction vessel.

In describing the invention, reference will first be made to the construction, which is illustrated in Figs. 5 to 11 of said prior application, and follow such description with a detailed explanation of the improved means for injecting the liquid reactant into the catalyst chambers; it being understood, however, that the improvement is also applicable to the construction shown in Figs. 1 to 4 of said application and to other embodiments of the basic invention therein claimed.

In the drawings:

Fig. 2 is a vertical sectional view through the liquid reactant distributor.

Fig. 3 is a sectional plan view on the line 3—3 of Fig. 2.

Fig. 4 is a face view showing a vertical series of the recesses from which previously distributed liquid reactant is injected into a vertical series of catalyst tubes.

Fig. 5 is an enlarged cross-sectional view of the spring-pressed block containing the vertical passage from which the liquid is distributed to said recesses and of a vertical passage through which steam is forced into the line of contact between such recess and the rotatable reaction vessel to prevent escape of the liquid.

Fig. 6 is a front elevation of the details shown in Fig. 5.

Figure 1:
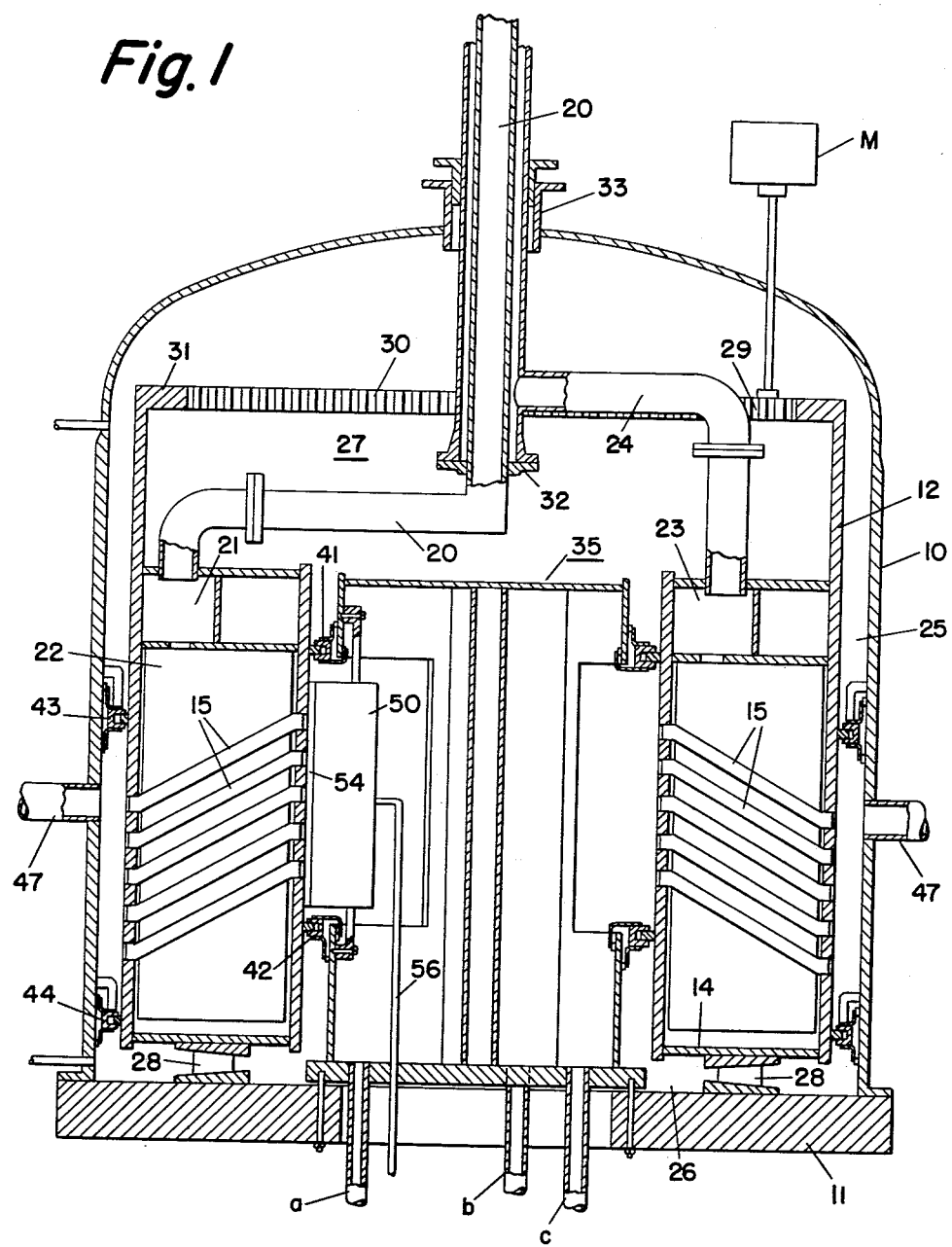
Fig. 1 is a vertical sectional view through the reactor.

10 is an outer cylindrical casing which is fixed to a supporting base 11. The casing 10 is made pressure-tight and encloses the reaction vessel containing the catalyst.

The reaction vessel 12 is annular in shape, being formed by an outer cylindrical wall and an inner cylindrical wall connected by upper and lower annular plates. The reaction vessel 12 contains a multiplicity of similarly shaped radially extending tubular members 15 arranged circumferentially within the reaction vessel 12 and grouped in a number of tiers one above another, each tier comprising a multitude of such tubular members arranged along approximately the same horizontal plane. This arrangement may be varied somewhat so long as a multiplicity of catalyst compartments are arranged completely around the reaction chamber and at different vertical levels. The opposite ends of each catalyst-containing tube are secured in apertures in the outside and inside walls respectively of the reaction vessel. The tubes are preferably inclined downward from their inner ends toward their outer ends. The tubes contain catalyst of a type and activity suitable for the desired hydrocarbon reaction. At their inlet ends the tubes may contain a relatively short section of heat retentive non-catalytic contact material for supplying heat of vaporization for the liquid hydrocarbon injected therein.

In Fig. 1 only five tiers are shown, but the commercial embodiment of the invention will contain a greater number of tiers, as disclosed in said application, so that the height of the tiers will exceed the radial width of the reaction vessel and reduce the volume of the spaces above and below the tiers of tubes; this, however, not being essential to the invention herein claimed.

The proper temperature is maintained within the reaction vessel by admitting heat exchange fluid through an inlet conduit 20 to an inlet manifold 21, which fluid passes therefrom through orifices in the upper wall of the reaction vessel to its interior. Within the reaction vessel are vertical baffles 22 around the lower edge of which the heating fluid passes upward through orifices in the upper wall of the reaction vessel to an outlet manifold 23 and thence to an outflow conduit 24.

The reaction vessel and the associated heat exchange circulating system form an assembly which is disposed within the casing 10 to provide an outer annular space 25 between the casing and the outer wall 12 of the reaction vessel, a lower space 26 between the base 11 and the lower wall 14 of the reaction vessel and an enlarged space 27 below the top of the casing. A set of rollers 28 is provided within the lower space 26 to rotatably support the reaction vessel, which is driven by a motor M through a gear wheel 29 engaging a ring gear 30 secured to an extension 31 of the reaction vessel. The inner heat exchange conduit 20 is connected to the lower end of the outer heat exchange conduit 24 by a flange 32 and both conduits are arranged for rotation with the reaction vessel in a stuffing box 33 extending through the roof of the casing 10.

Within and spaced from the reaction vessel is an inner stationary cylindrical casing 35 divided by a number of walls or partitions (one of which, 36, is shown in Fig. 3) into four (preferably sector-shaped) compartments into which are fed, respectively: the hydrocarbons to be reacted; purging fluid, such as steam; a regenerating medium, such as air, to remove carbon deposited on the catalyst in the first step; and a second purging medium to remove regenerating products formed during the third step. Three of the four supply conduits, lettered a, b and c, that supply three of the above specified fluids to their respective sectors are shown in Fig. 1. The specific construction of this inner stationary cylindrical casing is shown in detail in said application Serial No. 380,027, but is not so illustrated herein, since it forms no part of the invention herein claimed.

From the several sectors of the inner cylindrical casing the several specified fluids flow into an annular enclosure between the outer wall of the inner casing and the inner wall of the reaction vessel 12 and from said enclosure into the inner ends of the various catalyst-containing tubes 15.

As more particularly described in said prior application, the annular space between the inner casing and the reaction vessel that receives and supplies to the catalyst tubes the above specified fluids is sealed top and bottom by circumferential seals 41 and 42 shown in Figs. 1 and 2, while such annular space is divided into arcuate spaces (corresponding in number to the fluid supply chambers of the inner casing) by vertical seals 45, one of which is shown in Fig. 3. These vertical seals, four in number, align radially with the partitions that divide the inner casing into sector-shaped chambers as above described, so that each arcuate space constantly receives one of the four supply fluids specified.

Similarly the annular space between the reaction vessel and the enclosing outer cylindrical casing 10 is sealed top and bottom by similar circumferential seals 43 and 44, while such annular space is divided into arcuate spaces by vertical seals (not shown) similar to seals 45. The inner vertical seals and the outer vertical seals are arranged in pairs, the two seals of each pair being aligned radially so that, at any given time in the rotation of the reaction vessel, the same set of catalyst-containing tubes communicates with corresponding arcuate spaces inside and outside the reaction vessel.

It will be understood that the apparatus will be operative if the several specified admission fluids flow from compartments, outside the outer wall of the rotary reaction vessel, inwardly through the catalyst-containing tubes, the effluent discharge fluids flowing into the arcuate spaces inside the inner wall of such vessel, from which they may be separately removed. In such an embodiment the catalyst-containing tubes would preferably slant obliquely downward from the outer wall to the inner wall of the reaction vessel, although the apparatus would not be inoperative if, in either construction, the tubes should extend horizontally. This modification involves merely that type of equivalency known as reversal of parts. The invention herein claimed is not necessarily dependent upon either embodiment, as it may be found applicable to other basic structures not herein illustrated nor described.

This description, so far as it has proceeded, discloses no feature of construction which is essentially different from what is disclosed in said prior application. More complete illustration or description is unnecessary to understand the combination therewith of the improvement hereinafter described and claimed. It may be desirable, however, to briefly describe the operation common to that of said prior application and the present disclosure. As the reaction vessel rotates, each catalyst-containing tube 15 of each tier of tubes registers successively with the several arcuate spaces between the reaction vessel and the inner casing and therefore each catalyst-containing tube receives successively the several fluids supplied by the respective arcuate spaces from the respective compartments within the inner casing. At any given moment a considerable number of tubes receive the same fluid. The vertical seals, one of which, 45, is shown in Fig. 3, that determine the lengths of the several arcuate spaces between the inner casing and the rotating reaction vessel are of sufficient width to each just overlap the inlet to each tube. The same description applies to the arcuate spaces between the rotating reaction vessel and the outer casing. Thus at any given moment one set of tubes is receiving, from one of the chambers of the inner casing and the corresponding inner arcuate space, the same hydrocarbon reactant or the same purging fluid and is discharging the products of reaction or purging into the corresponding outer arcuate space, from each of which outer arcuate spaces the products of reaction or purging are removed by a common outlet conduit. (Two of these outlet conduits 47 are shown in Fig. 1.)

Having now given a general description of one type of hydrocarbon conversion apparatus to which our invention is applicable (it being understood that the invention is not, in its broadest aspect, limited in its application to an apparatus of the described specific construction), the construction which, combined with such an apparatus, embodies our invention will now be described.

Hereinbefore it has been pointed out that it is known in the art of catalytic cracking of hydrocarbons to introduce to the reactor, together with a gaseous hydrocarbon reactant, a liquid hydrocarbon reactant. The introduction of a liquid reactant to all of the catalyst-containing tubes in a uniform proportion to the gaseous reactant and with prevention of leakage presents certain difficulties hereinbefore mentioned and which in our invention are overcome.

In the improvement herein described it is insured that the liquid hydrocarbon will flow as directly as possible into the catalyst-containing tubes, that substantially all of the liquid reactant will be injected into such tubes with avoidance of accumulation of deposits on the wall of the reaction vessel, and that the rate of inflow to all such tubes will be substantially uniform.

It should be mentioned that the inlet end of each of the catalyst-containing tubes, inserted into an opening in the inner wall of the reaction vessel, is preferably confined therein by an inside ring 16, over which ring and the end of the tube is a screen 17 to prevent escape of catalyst into the arcuate feeding zone; the end of the tube and the periphery of the screen being secured within the orifice in the casing by welding, as shown at 18.

A liquid oil distributing support 50 (see Fig. 2) is secured, at its upper and lower ends, to the inner casing 35. The distributor support extends from above to below the tiers of catalyst tubes and is divided into a number of radial compartments 53 the open outer ends of which partly enclose a distributor block 54 (see also Fig. 3), which extends vertically, like its support 50, from above to below the tiers of catalyst tubes. The distributor 54, which preferably is made as a single piece (although it may be made in sections, say one for each tier of tubes), has a sliding fit in a radial direction in the support 50 and is maintained pressed against the reaction casing wall by compression springs 55, one end of each spring pressing against the inner wall of one of the compartments of the distributor support 50 and the other end engaging the slidable block 54. In one of such compartments the spring 55 is coiled about a conduit 56. Through this conduit is conveyed, under appropriate pressure, the hydrocarbon liquid to be injected into the catalyst-containing tubes. The end of conduit 56 communicates with a vertical distributing passage 57 formed in the distributor block 54. This passage 57 is closed top and bottom by plugs 58 and is maintained filled with the hydrocarbon liquid.

Formed in the wall of the distributor block 54 that contacts with the wall of the reaction vessel are recesses 59, one for each tier of tubes. A restricted liquid flow passage 60 connects the passage 57 with the recesses 59. Thereby the hydrocarbon liquid is injected at a constant rate directly into successive sets of vertically aligned catalyst-containing tubes.

Since the distributor 54 has a close sliding fit with the rotating reaction vessel, leakage of liquid hydrocarbon is minimized. However, to further insure against such leakage, a restricted vertical passage 61 extends vertically through the distributor 54 and opens against the wall of the reaction vessel and along a path which communicates with all the recesses 59. Through a conduit 62, communicating with the passage 61, steam, or other appropriate fluid, under a pressure greater than that to which the inflowing hydrocarbon liquid is subjected, prevents any leakage of liquid that might otherwise occur between the distributing block and the casing wall in the direction of travel of the reaction vessel.

Another feature of the invention is the location of the distributor. It is desirable to locate the injecting apparatus as close as practicable to a selected one of the two vertical seals bounding the arcuate space into which are fed the hydrocarbons to be reacted. The selected seal is that which may be said to delimit that end of said arcuate space into which the catalyst tubes, in their rotation, first enter; or, expressed otherwise, the rear of said space relative to the direction of rotation of the reaction vessel. This is of some importance in that it has to do with the most effective timing of the injection of the hydrocarbon liquid. The liquid entering any catalyst tube has thus a maximum time for vaporization and reaction during the time that it is in communication with the source of the hydrocarbon reactant, so that the liquid will be fed to the catalyst tubes when there is the most heat available for vaporization and reaction.

While as applied to some other use it may be desirable to locate the point or line of liquid injection at some other position, its location, as applied to apparatus of the type hereinbefore described, is of such specifically new mode of operation as to constitute a patentable combination.

We claim:

1. In a converter in which an annular reaction vessel containing transversely extending catalytic chambers is continuously rotatable, the herein described means for feeding a single liquid reactant to the catalyst chambers, the same comprising a stationary distributor support, a distributor carried by, and having a sliding fit with, said support, means constantly pressing the distributor against the wall of the rotary reaction vessel, the distributor having a vertically extending distributing passage and radially extending passages all constantly communicating with said distributing passage for simultaneous individual communication with the catalyst chambers, and a conduit communicating with said distributing passage for supplying said liquid reactant thereto.

2. In a converter in which an annular reaction vessel containing transversely extending catalytic chambers is continuously rotatable, the herein described means for feeding a single liquid reactant to the catalyst chambers, the same comprising a stationary distributor support, a distributor carried by, and having a sliding fit with, said support, means constantly pressing the distributor against the wall of the rotary reaction vessel, the distributor having a vertically extending distributing passage, a conduit communicating with said distributing passage for supplying liquid reactant thereto, there being recesses in the wall of the distributor contacting with the wall of the reaction vessel, said recesses being in constant communication with the distributing passage.

3. The combination specified in claim 1 wherein the distributor is provided, along the face thereof contacting with the reaction vessel, with a vertically extending groove that skirts said radially extending passages along the line of sliding contact between the distributor and the reaction vessel, and a conduit through which steam may be conveyed to said groove.

4. A converter in which different fluids are fed successively into catalyst containers and from which the different products are successively removed, the same comprising a fixed outer cylindrical casing, a fixed inner cylindrical casing, an annular revoluble reaction vessel containing a multiplicity of catalyst chambers arranged in tiers and extending generally radially within the vessel, said vessel being located between the inner and outer casings and spaced from both to form inner and outer circumferential spaces partitioned by vertically and circumferentially extending sealing devices to form inner and outer arcuate spaces, one set of arcuate spaces adapted to receive the respective fluids, and the outer set of arcuate spaces adapted to receive the effluent fluids; in combination with a device for injecting a liquid reactant into catalytic chambers that at any given time in the rotation of the reaction vessel communicate with one of said arcuate spaces; said device comprising a stationary distributor support extending throughout the height of the tiers of catalyst chambers and extending within the last named arcuate space, a vertically extending distributor carried by said support and spring-pressed into contact with the wall of the reaction vessel, said distributor having a vertically extending distributing passage and radially extending passages connecting therewith for individual communication with the catalyst chambers, and a conduit communicating with said distributing passage for supplying liquid reactant thereto.

5. The combination specified in claim 4 wherein the distributor is provided, along the face thereof contacting with the reaction vessel, with a vertically extending groove that skirts said radially extending passages along the line of sliding contact between the distributor and the reaction vessel, and a conduit through which steam may be conveyed to said groove.

6. The combination specified in claim 4 in which the distributor is located substantially adjacent to that one of the two vertically extending sealing devices which limits that end of the last named arcuate space into which the catalyst-containing tubes in their circumferential travel first enter.

7. The combination expressed in claim 4 in which the distributor is located toward the rear of the last-named arcuate space relative to the direction of rotation of the reaction vessel.

References Cited in the file of this patent
UNITED STATES PATENTS

| | | |
|---|---|---|
| 1,912,784 | Miller et al. | June 6, 1933 |
| 2,355,024 | Yerrick et al. | Aug. 1, 1944 |